United States Patent
Lin (10) Patent No.: US 8,208,084 B2
(45) Date of Patent: Jun. 26, 2012

(54) ARRAY SUBSTRATE WITH TEST SHORTING BAR AND DISPLAY PANEL THEREOF

(75) Inventor: Jian-Hong Lin, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 603 days.

(21) Appl. No.: 12/369,748

(22) Filed: Feb. 12, 2009

(65) Prior Publication Data
US 2010/0014030 A1    Jan. 21, 2010

(30) Foreign Application Priority Data
Jul. 16, 2008    (TW) ................................ 97126985 A (51) Int. Cl.
*G02F 1/1333* (2006.01)
*G02F 1/13* (2006.01)

(52) U.S. Cl. ............... 349/40; 349/54; 349/55; 349/192
(58) Field of Classification Search .............. 349/54–55, 349/192
See application file for complete search history.

(56) References Cited

U.S. PATENT DOCUMENTS

| | | | |
|---|---|---|---|
| 6,246,074 B1 | 6/2001 | Kim et al. | |
| 6,613,650 B1 * | 9/2003 | Holmberg | 438/438 |
| 6,624,857 B1 * | 9/2003 | Nagata et al. | 349/54 |
| 7,129,923 B2 | 10/2006 | Lu | |
| 7,576,807 B2 | 8/2009 | Chen et al. | |
| 2005/0056833 A1 * | 3/2005 | Kim | 257/48 |
| 2008/0117345 A1 * | 5/2008 | Ishii et al. | 349/40 |
| 2008/0180592 A1 * | 7/2008 | Yu et al. | 349/54 |
| 2009/0167976 A1 * | 7/2009 | Chung et al. | 349/54 |

FOREIGN PATENT DOCUMENTS

| | | |
|---|---|---|
| CN | 1556436 | 12/2004 |
| CN | 101216643 | 7/2008 |
| TW | 200728824 | 8/2007 |
| TW | 200743886 | 12/2007 |

OTHER PUBLICATIONS

"1st Office Action of China counterpart application", issued on Jun. 5, 2009, p. 1-p. 6.
"Office Action of Taiwan Counterpart Application", issued on Feb. 22, 2012, p1-p5, in which the listed references were cited.

* cited by examiner

*Primary Examiner* — Hoan C Nguyen
(74) *Attorney, Agent, or Firm* — Jianq Chyun IP Office (57) ABSTRACT

An array substrate having a display region and a peripheral circuit region adjacent to the display region is provided. The array substrate includes a pixel array, a plurality of test shorting bars and a plurality of wires. The pixel array is disposed in the display region. The test shorting bars are disposed in the peripheral circuit region. The wires electrically connected with the pixel array are disposed in the peripheral circuit region. Specially, at least one wire and the test shorting bar share a part for connecting each other and the part forms a common trace.

11 Claims, 10 Drawing Sheets

ARRAY SUBSTRATE WITH TEST SHORTING BAR AND DISPLAY PANEL THEREOF

CROSS-REFERENCE TO RELATED APPLICATION

This application claims the priority benefit of Taiwan application serial no. 97126985, filed Jul. 16, 2008. The entirety of the above-mentioned patent application is hereby incorporated by reference herein and made a part of specification.

BACKGROUND OF THE INVENTION

1. Field of the Invention

The present invention relates to a substrate, and particularly relates to an array substrate formed by connecting at least a wire and one of a plurality of test shorting bars which share a part.

2. Description of Related Art

A liquid crystal display panel has the advantages of thin thickness, high resolution, low power consumption, and no radiation, and thus has become the mainstream among all displays panels. Additionally, as liquid crystal display panels become widely used, the haggling competition thereof is getting drastic. Hence, how to effectively reduce production costs to increase competitiveness has become the goal of the manufacturers in this field.

Generally speaking, a liquid crystal display panel is mainly formed by an array substrate, a liquid crystal layer, and a color filter substrate. Herein, in order to effectively fabricate the array substrate, a plurality of arrays is usually formed simultaneously on a mother substrate, and array test procedures and repair procedures are timely performed on each array on the mother substrate during the array process, so as to increase the yield rate thereof. After the array process is finished on the mother substrate, a cutting process is performed to the mother substrate to divide the arrays thereon from each other, so as to complete fabricating a plurality of array substrates.

Figure 1A:
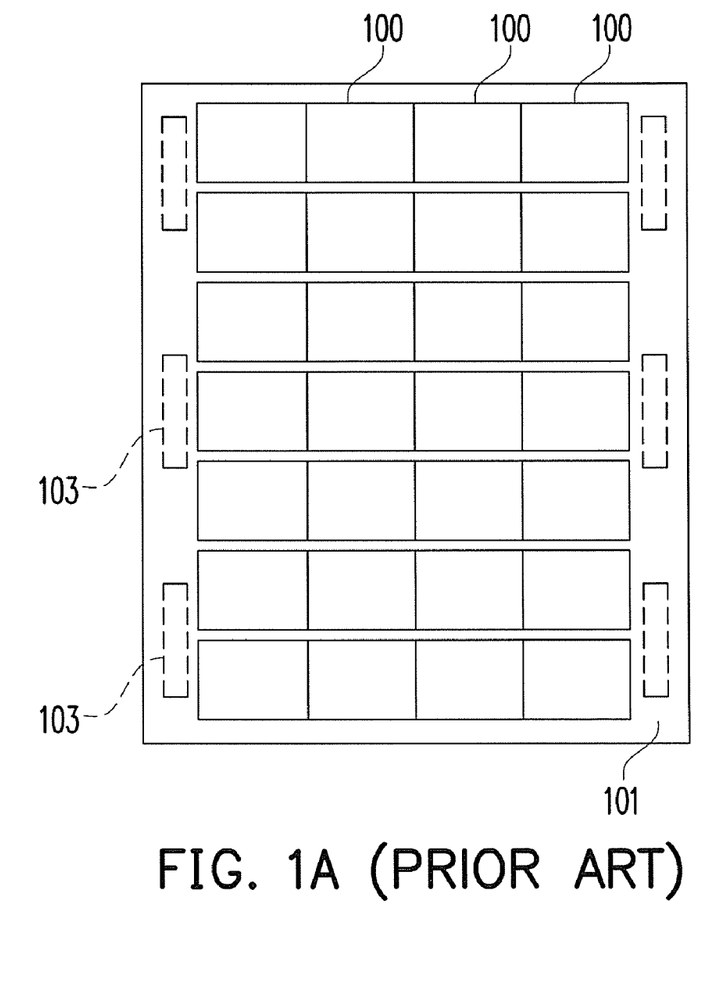
FIG. 1A is a top view illustrating a plurality of arrays formed on a mother substrate according to a conventional technique.
Figure 1B:
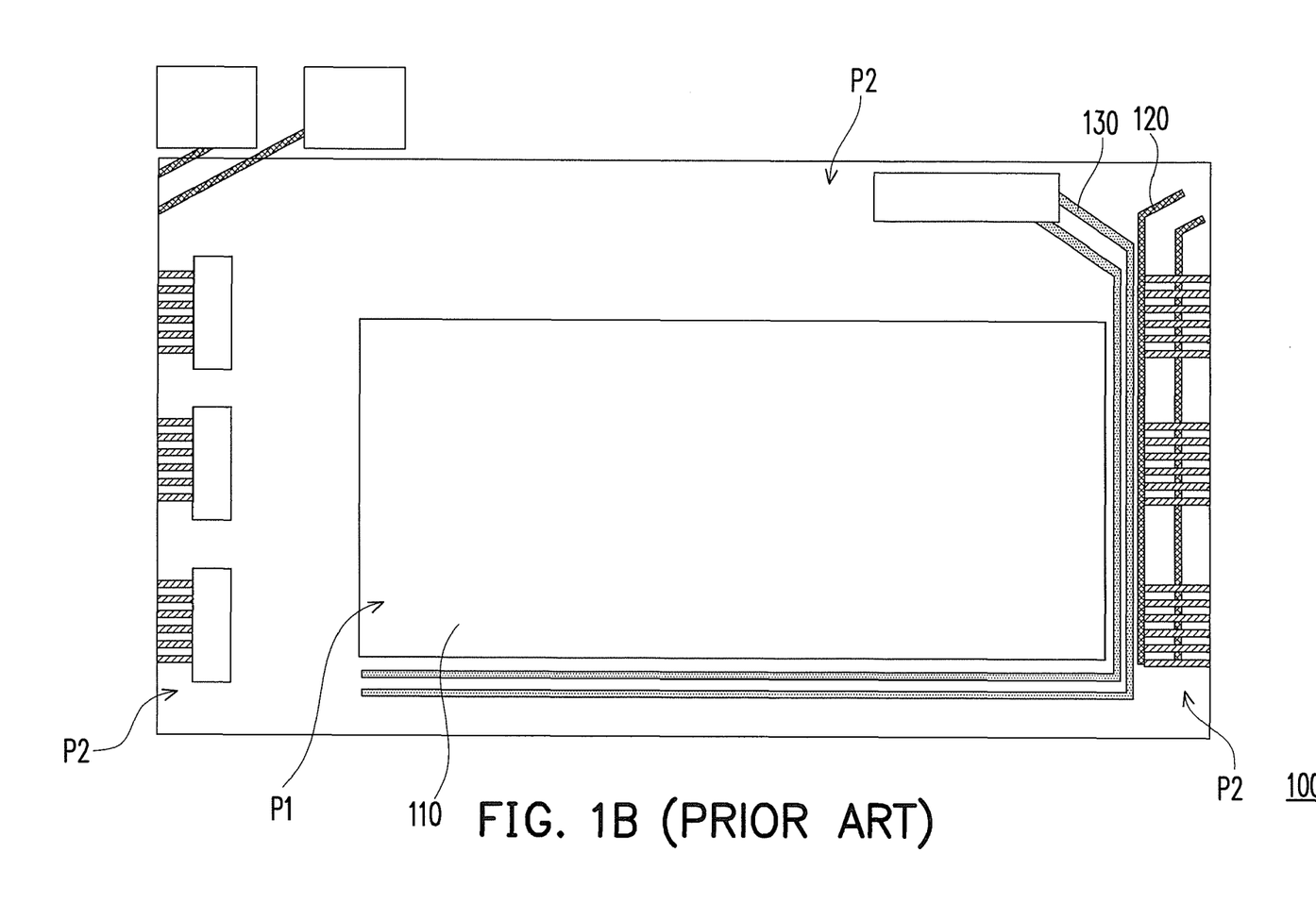
FIG. 1B is a top view illustrating an array substrate formed after a cutting process is performed on the mother substrate in FIG. 1A.

FIG. 1A is a top view illustrating a plurality of array substrates formed on a mother substrate according to a conventional technique; and FIG. 1B is a top view illustrating an array substrate 100 formed after a cutting process is performed on the mother substrate in FIG. 1A. Referring to FIGS. 1A and 1B, a mother substrate 101 comprises a plurality of pixel arrays, wherein each pixel array located in an array substrate predetermined forming region 100. After the cutting process is performed to the mother substrate 101, each array substrate 100 having a display region P1 and a peripheral circuit region P2 adjacent to the display region P1 is formed. The array substrate 100 comprises a pixel array 110, a plurality of test shorting bars 120, and a plurality of repair lines 130. As shown in FIG. 1B, the pixel array 110 is disposed in the display region P1. The test shorting bars 120 and the repair lines 130 are disposed in the peripheral circuit region P2, and the repair lines 130 are electrically connected with the pixel array 110, wherein the aforesaid array test is to test the circuit by the test shorting bars 120. In a preferable embodiment, the mother substrate 101 comprises a plurality of alignment marks 103. The alignment marks 103 are used for precise alignment, so as to prevent deviation from occurring when a lithographic process, an etching process, an assembling process, or other processes requiring the alignment marks 103 for precise alignment are performed on the mother substrate 101.

In conventional technology, the arrays on the mother substrate 101 are usually arranged as dense as possible to increase the utilization of the mother substrate 101, or the distance between the alignment marks 103 and the arrays is shortened as much as possible to reduce production costs. For example, the size of the mother substrate 101 in FIG. 1A is 1300 mm×1100 mm, and 28 array substrates 100 are arranged as a 7×4 rectangle. However, as a consequence, the positions of a portion of the array substrate predetermined forming regions 100 may become too close to the alignment marks 103 or the alignment marks 103 may fall within the array substrate predetermined forming regions 100, which easily cause the machines to fail to catch the alignment marks 103 during the succeeding fabricating processes, such as a lithographic process, an etching process, an assembling process, or other processes requiring the alignment marks 103 for precise alignment, and result in abnormal alignment. Consequently, the fabrication of the array substrates 100 is influenced.

Figure 1C:
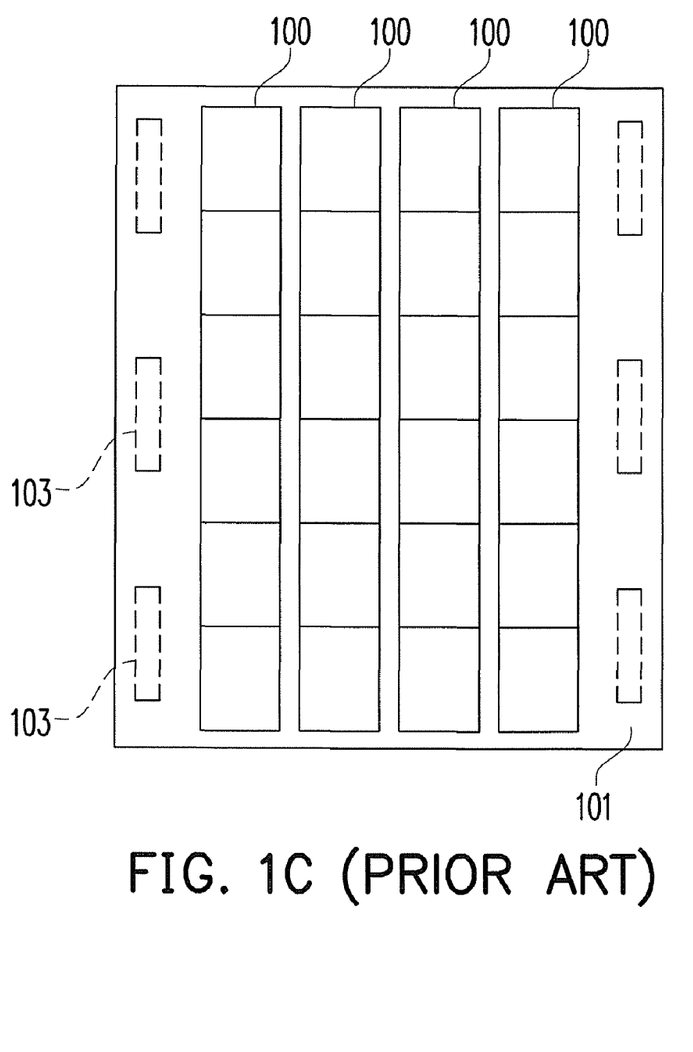
FIG. 1C illustrates another arrangement of array substrates.

To solve this problem, the conventional technology applies another arrangement of the substrates 100 in the 1300 mm×1100 mm mother substrate 101. For example, FIG. 1C illustrates another arrangement of the substrates 100. This kind of arrangement allows a certain distance to be maintained between the positions of the array substrate predetermined forming regions 100 and the alignment marks, such that the machines can precisely identify the alignment marks 103. However, this 6×4 arrangement of 24 pieces will reduce the production quantity. Additionally, in consideration of other process margins during the fabrication, such as effective film deposition margin, the layout of the predetermined forming region array substrates 100 on the mother substrate 101 is limited. Therefore, one of the purposes of the present invention is to reduce the region of the peripheral circuit region P2 and decrease the overall outline of the array substrate 100, such that the array substrates 100 can be effectively divided to improve the utilization of the mother substrate 101, and further to reduce the costs for producing the liquid crystal display panels.

SUMMARY OF THE INVENTION

The present invention provides an array substrate including a peripheral circuit region having a smaller layout region for increasing the utilization of the substrate.

The present invention provides a display panel comprising the aforesaid array substrate for reducing production costs.

The present invention provides an array substrate including a display region and a peripheral circuit region adjacent to the display region. The array substrate comprises a pixel array, a plurality of test shorting bars, and a plurality of wires. The pixel array is disposed in the display region. The test shorting bars are disposed in the peripheral circuit region. The wires are disposed in the peripheral circuit region and electrically connected with the pixel array. Moreover, at least one wire and one of the test shorting bars respectively share a part for connecting with each other and forming a common trace.

The present invention further provides a display panel including a first substrate, a second substrate, and a liquid crystal layer. The first substrate comprises a display region and a peripheral circuit region adjacent to the display region, and the first substrate includes a pixel array, a plurality of test shorting bars, and a plurality of wires. The pixel array is disposed in the display region. The test shorting bars are disposed in the peripheral circuit region. The wires are disposed in the peripheral circuit region and electrically connected with the pixel array. Moreover, at least one wire and one of the test shorting bars respectively share a part for connecting with each other and forming a common trace. Additionally, the second substrate is disposed opposite to the first substrate. The liquid crystal layer is disposed between the first substrate and the second substrate.

In an embodiment of the present invention, the aforesaid wires comprise a first signal source connection wire and a pixel array connection wire, wherein at least one of the wires further comprises the common trace. The common trace connects the first signal source connection wire with the pixel array connection wire. In an embodiment, the aforesaid array substrate further comprises a data driving circuit. The data driving circuit is connected with the first signal source connection wire and is adapted for transmitting driving signals. In one embodiment, a material of the first signal source connection wire, the common trace, and the pixel array wire is the same as that of the test shorting bars. In another embodiment, the aforesaid first signal source connection wire is connected with the common trace through a contact window and a material of the first signal source connection wire is different from that of the common trace. In an embodiment, the aforesaid wires comprise a second signal source connection wire. The second signal source connection wire is electrically connected with a gate driving circuit, and the gate driving circuit is adapted for transmitting driving signals.

In another embodiment of the present invention, the aforesaid test shorting bars comprise a first trace. At least one of the test shorting bars comprises the common trace and the first trace, wherein the first trace is connected with the common trace.

In an embodiment of the present invention, the aforesaid array substrate comprises at least one dummy test pad. The dummy test pad is connected with a dummy first trace. The first trace and the dummy first trace are correspondingly disposed in the peripheral circuit region adjacent to two sides of the display region respectively, and the first trace is insulated from the dummy first trace.

In an embodiment of the present invention, the aforesaid array substrate comprises a plurality of second traces, a plurality of dummy second traces, and a plurality of gate driving circuits. The second traces and the dummy second traces are respectively electrically connected with the test shorting bars and the gate driving circuits. The second traces and the dummy second traces are correspondingly disposed in the peripheral circuit region adjacent to two sides of the display region respectively, and the second traces are insulated from the dummy second traces.

In an embodiment of the present invention, the aforesaid array substrate comprises an electrostatic protection shorting bar. The electrostatic protection shorting bar is disposed in the peripheral circuit region and insulated from the test shorting bars.

To conclude, in the array substrate of the present invention, the test shorting bars and the wires in the peripheral circuit region are designed to share a part, and thus the overall region of the peripheral circuit region is reduced. In other words, the array substrate of the present invention has better substrate utilization. Therefore, the layout density on the mother substrate could be denser and the miss alignment during the array process caused from the alignment mark not identifiable could be avoided. Hence, the costs for fabricating the display panel disposed with the array substrate are lower.

To make the above and other objectives, features, and advantages of the present invention more comprehensible, preferable embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 2A:
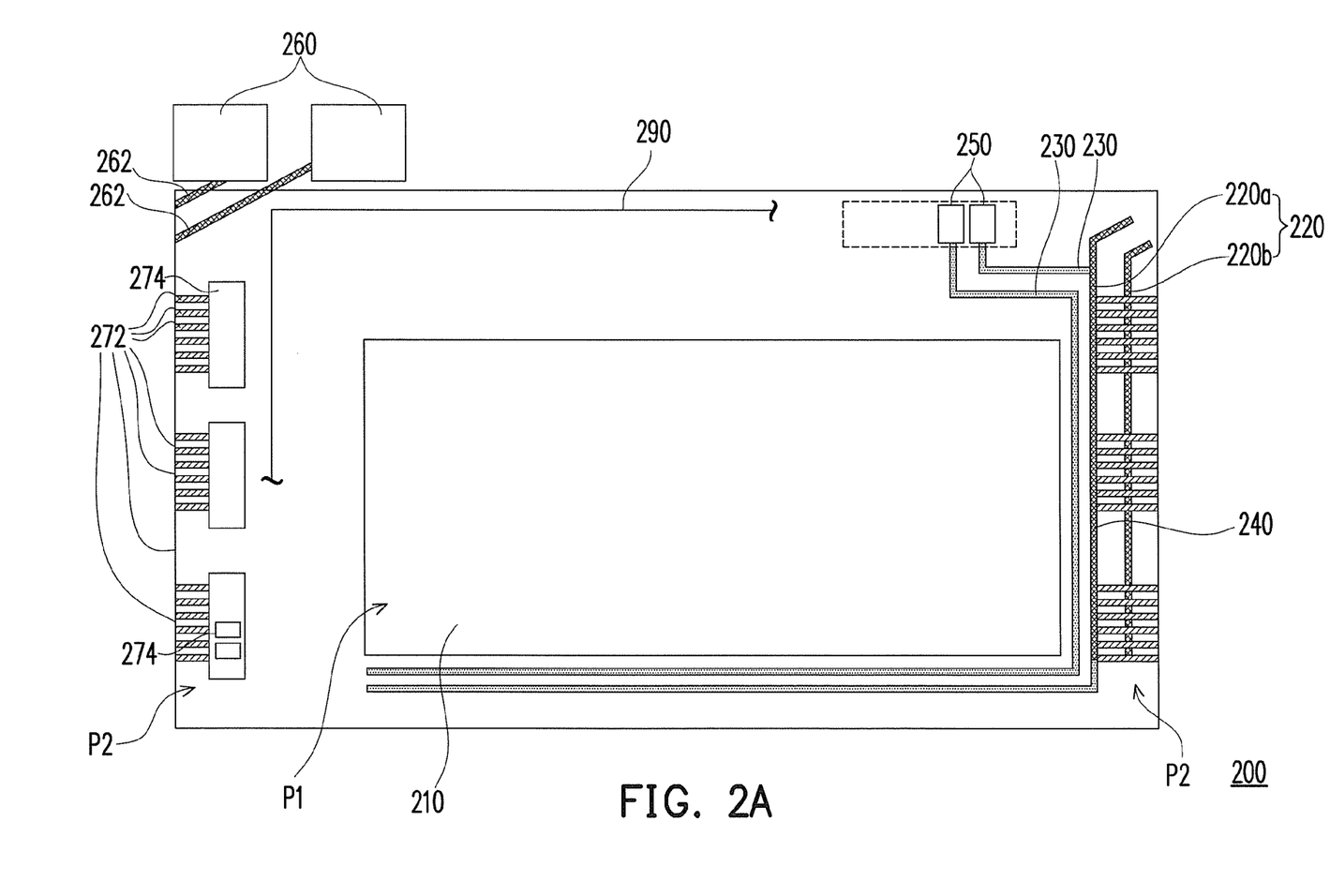
FIG. 2A is a top view illustrating an array substrate in the first embodiment of the present invention.

FIG. 2A is a top view illustrating an array substrate in the first embodiment of the present invention. Referring to FIG. 2A, an array substrate 200 comprises a display region P1 and a peripheral circuit region P2 adjacent to the display region P1. The array substrate 200 comprises a pixel array 210, a plurality of test shorting bars 220, and a plurality of wires 230 (for example, repair lines or repair wires). The test shorting bars 220 are usually used for detecting whether the arrays on a mother substrate (not shown) is electrically connected or disconnected (for example, short circuit or open-circuited). The pixel array 210 is disposed in the display region P1. The test shorting bars 220 and the wires 230 are disposed in the peripheral circuit region P2, and the wires 230 are electrically connected with the pixel array 210.

Additionally, the test shorting bars 220 can be divided into at least two types 220a and 220b, wherein at least one wire 230 and one of the test shorting bars 220 respectively share a part for connecting each other and forming a common trace 240. In this embodiment, for instance, one of the wires 230 and the test shorting bar 220a share a part which forms the common trace 240, as shown in FIG. 2A.

Figure 2B:
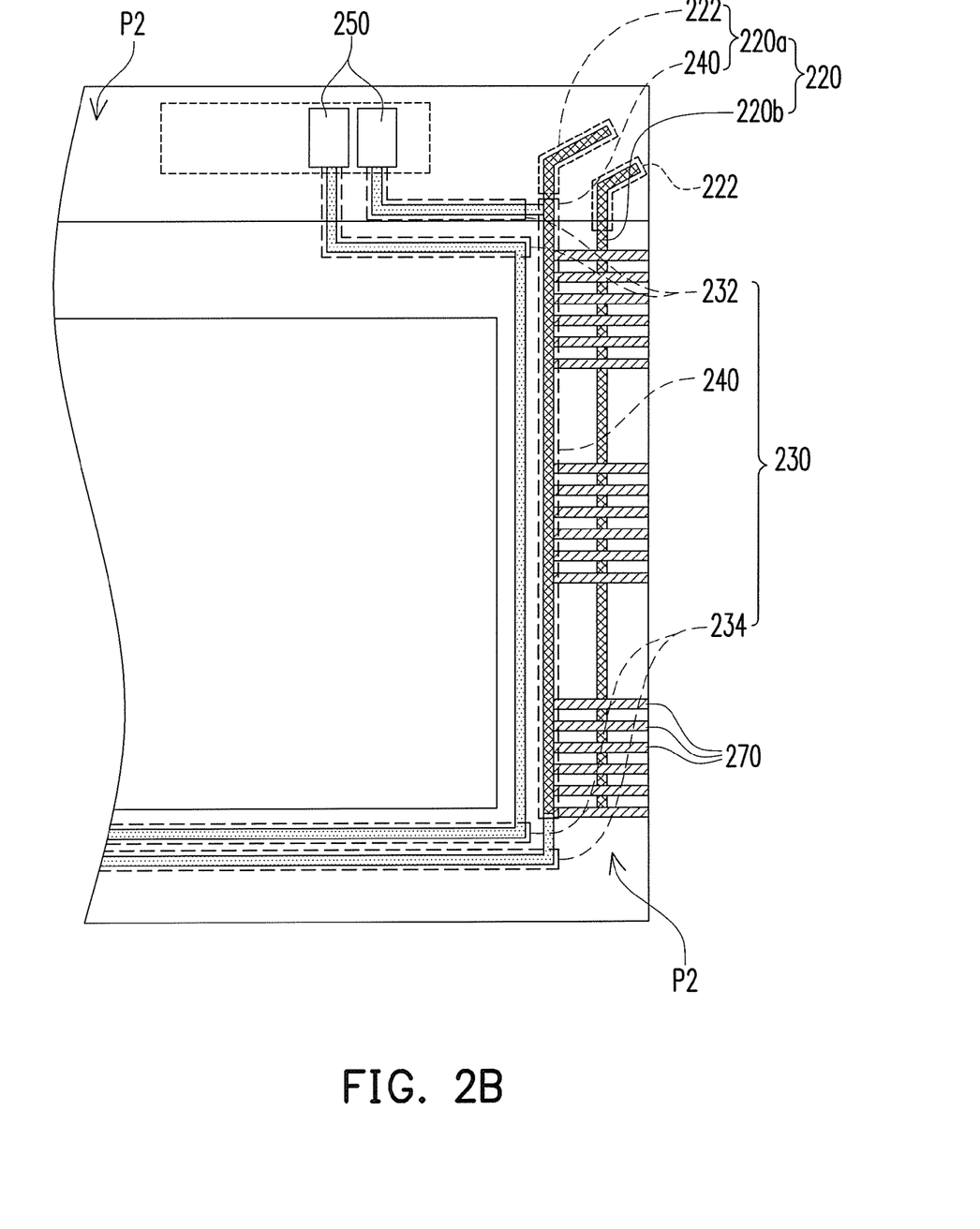
FIG. 2B is a top view illustrating a portion of the array substrate in FIG. 2A.

Specifically, FIG. 2B is a top view enlarging a portion of the array substrate in FIG. 2A. Referring to FIG. 2B, each of the test shorting bars 220 comprises a first trace 222, wherein the first trace 222 is used for transmitting test signals. In this embodiment, the test shorting bar 220a comprises the first trace 222 and the common trace 240, and the first trace 222 of the test shorting bar 220a is connected with one of the wire 230 through the common trace 240, as shown in FIG. 2B. In other words, the common trace 240 is used for transmitting driving signals and test signals.

Referring to FIG. 2B, the wires 230 comprise first signal source connection wires 232 and pixel array connection wires 234. In this embodiment, at least one repair wire 230 may comprise the first signal source connection wire 232, the common trace 240, and the pixel array connection wire 234, wherein the first signal source connection wire 232 and the pixel array connection wire 234 are respectively disposed at two sides of the common trace 240, as shown in FIG. 2B. When a defect is detected in the pixel array 210, a specific signal provided by data driving circuits 250 is transmitted to the pixel array 210 through the path of the wires 230, such that the pixel array 210 with the defect can remain operable at a certain level. Hence, the wires 230 have the function of repairing the defect in the array substrate 200. In other words, the wires 230 are also called repair lines.

For example, when open-circuited occurs in a data line of the array substrate 200, the data line is divided into one part connected with a data driving circuit and the other part separated from the data driving circuit. By the connection of welding process, the wires 230 are able to transmit driving signals to the data lines which are separated by the open-circuited and allow the pixels in the same data line to be driven without being influenced by the open-circuited. In this embodiment, a material of the first signal source connection wires 232, the common trace 240, and the pixel array connection wires 234 may be the same as that of the test shorting bars 220. The material is, for example, formed by using a first metal layer. However, this is merely one of the examples, and the present invention is not limited thereto. In other embodiments, the material of the first signal source connection wires 232, the common trace 240, and the pixel array connection wires 234 may be different from that of the test shorting bars 220.

Further, referring to FIGS. 2A and 2B, the array substrate 200 comprises data driving circuits 250. The data driving circuits 250 are connected with the first signal source connection wires 232 and adapted for transmitting a driving signal. Specifically, as described above, when open-circuited occurs in an element inside the array substrate 200, for example the data line is in an open-circuited, the designer may use a data driving circuit connected with the data driving circuits 250 to generate proper driving signals, which are corresponding to the driving signals transmitted by the original data line, and transmit the driving signals to the wires 230 through the data driving circuits 250 and then transmit the driving signals to the element in an open-circuited through the wires 230. Thereby, the elements connected by the same circuit can still be driven without being influenced by the open-circuited.

Figure 2C:
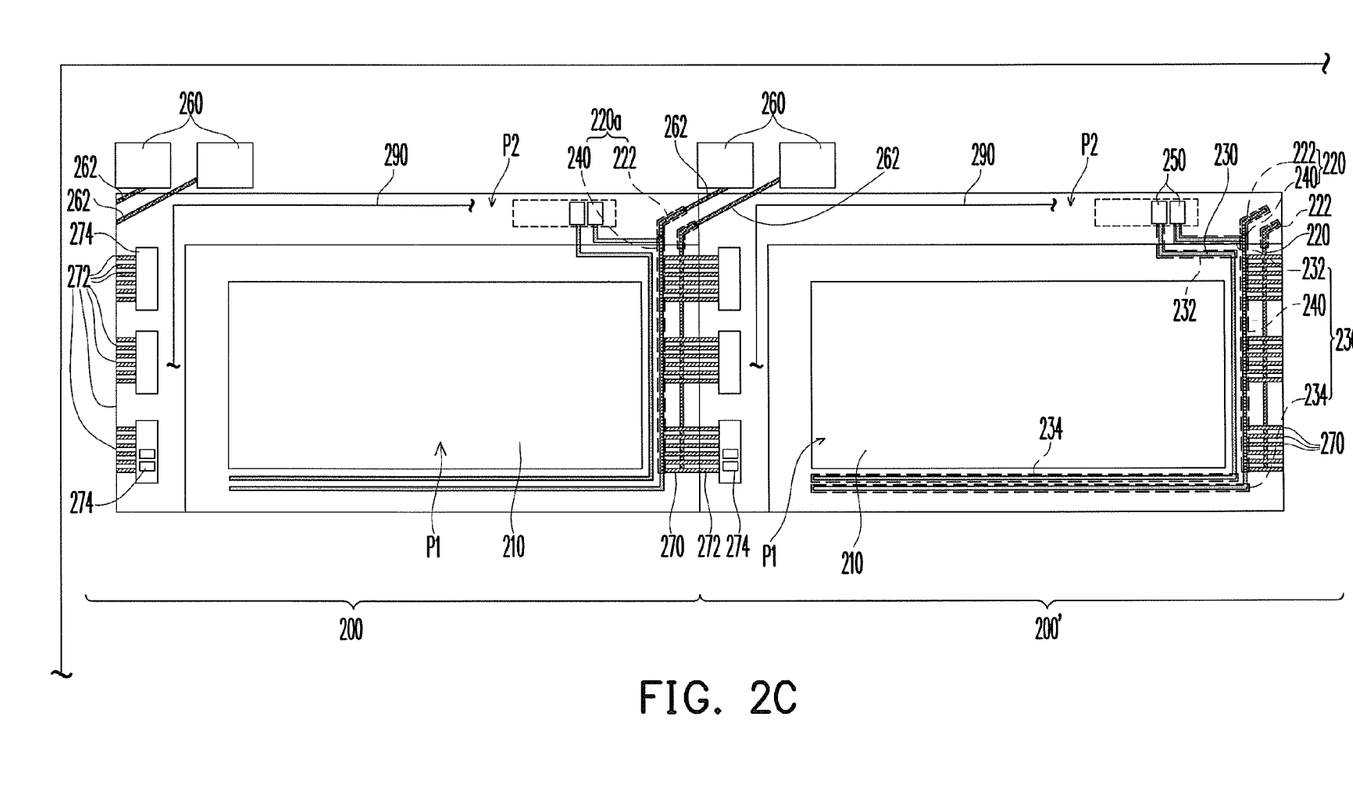
FIG. 2C is an enlarged view illustrating a portion of the mother substrate when array test is performed.

In this embodiment, the array substrate 200 comprises dummy test pads 260, as shown in FIG. 2A. The dummy test pads 260 are used in the array process of the array substrate 200 for performing array test on the mother substrate through the dummy test pads 260 on a neighboring array substrate 200'. To be more specific, FIG. 2C is an enlarged view illustrating a portion of the mother substrate when array test is performed, wherein a portion of the array substrates 200 and 200' is completed, but a cutting process is not performed on the mother substrate yet. Referring to FIG. 2C, the dummy test pads 260 are connected with the dummy first traces 262. The first traces 222 and the dummy first traces 262 are correspondingly disposed in the periphery circuit region P2 adjacent to two sides of the display region P1, respectively, such that the first traces 222 of the array substrate 200 are electrically connected with the dummy first traces 262 of the neighboring array substrate 200' before the cutting process is performed, as shown in FIG. 2C. During the array test, a probe contacts the dummy test pads 260 of the array substrate 200' to perform an electrical inspection by transmitting a signal through the dummy first traces 262 of the array substrate 200' and the test shorting bars 220 of the array substrate 200. Additionally, when the cutting process is performed to form the array substrates 200 and array substrates 200', the first traces 222 and the dummy first traces 262 are insulated from each other, and thus the display of the array substrates 200 and 200' is not influenced, as shown in FIG. 2A.

Then, referring to FIGS. 2A, 2B, and 2C, after the cutting process, the array substrate 200 further comprises a plurality of second traces 270, a plurality of dummy second traces 272, and a plurality of gate driving circuits 274. The second traces 270 and the dummy second traces 272 are respectively electrically connected with the test shorting bars 220 and the gate driving circuits 274. The second traces 270 are insulated from the dummy second traces 272. The second traces 270 and the dummy second traces 272 are correspondingly disposed in the periphery circuit region P2 adjacent to two sides of the display region P1, respectively, as shown FIG. 2A. Therefore, the second traces 270 and the gate driving circuits 274 are disposed in the periphery circuit region P2, the same side with the dummy first traces 262 while opposite side to the test shorting bars 220.

In the following paragraphs, FIG. 2C is used to describe the array test when the cutting process in not yet performed on the mother substrate. Referring to FIG. 2C, in practice, the probe (not shown) may be used to contact the aforesaid dummy test pads 260 when the array test is performed. Based on the test method and test timing, the probe may be used for outputting driving signals or receiving signals transmitted by the dummy first traces 262. However, the present invention is not limited thereto. For instance, an electrical inspection may be performed on the array substrate 200' by the dummy first traces 262 of the substrate 200', the test shorting bar 220a of the substrate 200, the second traces 270 of the substrate 200, the dummy second traces 272 of the substrate 200', and the gate driving circuits 274 of the substrate 200'. In this embodiment, the test shorting bar 220a comprises the first trace 222 and the common trace 240. Before the cutting process is performed on the mother substrate, the dummy first traces 262 of the substrate 200' are electrically connected with the first traces 222 of the substrate 200, and the second traces 270 of the substrate 200 are electrically connected with the dummy second traces 272 of the substrate 200', as shown in FIG. 2C.

In addition, the array substrate 200 comprises an electrostatic protection shorting bar 290, as shown in FIGS. 2A and 2C. The electrostatic protection shorting bar 290 is disposed in the peripheral circuit region P2 and insulated from the test shorting bars 220, wherein the test shorting bars 220 are mainly used for transmitting test signals, and the electrostatic protection shorting bar 290 is mainly used for discharging the electrostatic charges accumulated in the array substrate 200. In other words, the test shorting bars 220 are different from the electrostatic protection shorting bar 290. To be more specific, because every object has electrostatic charges, the electrostatic protection shorting bar 290 is used for preventing the array substrate 200 from being damaged by static electricity in the environment during fabrication.

The difference between the present invention and the conventional technology lies in that the wires 230 (or called repair lines) and the test shorting bars 220 in the array substrate 200 share a part to save the space for fabricating the wires 230 and the test shorting bars 220. In other words, common trace 240 plays a role as transmitting test signals during array test, and plays another role as transmitting driving signals after an open-circuited defect occurs to data lines. Hence, the array substrate 200 has favorable utilization of the mother substrate. Moreover, the present invention reduces the layout space of the peripheral circuit region to increase the utilization of the mother substrate in the array process. Consequently, the production costs are reduced, and the problems of abnormal alignment which occurs in the conventional technology and limited process margin are avoided. In addition, when the wires 230 and the test shorting bars 220 share a part, the wire width of the test shorting bars 220 is larger than that of the wires 230, and thus the resistance in the original wires is usually decreased to improve the performance of the defective pixels or open-circuited signal wires which have been repaired.

Second Embodiment

Figure 3:
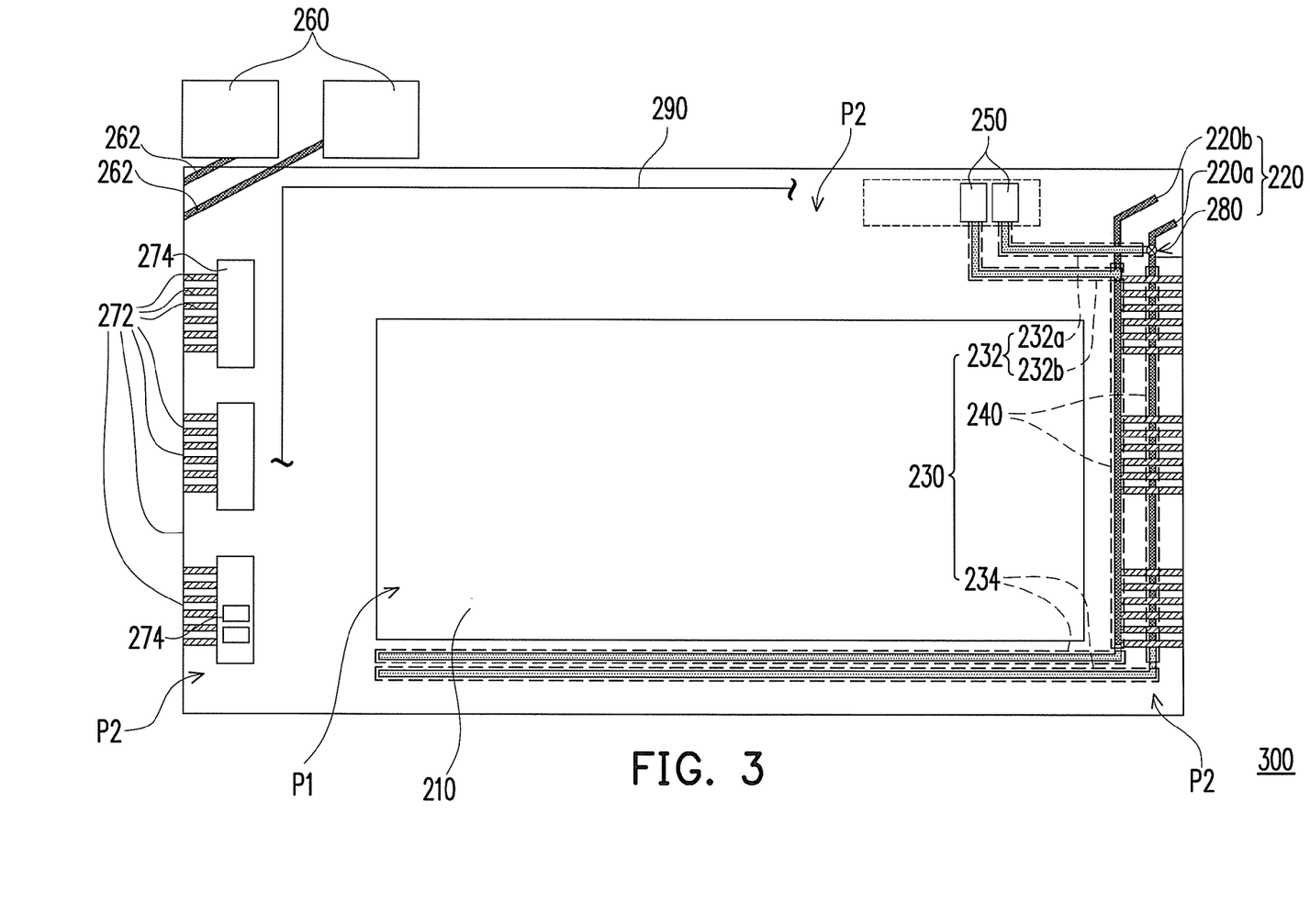
FIG. 3 is a top view illustrating an array substrate in the second embodiment of the present invention.

FIG. 3 is a top view illustrating an array substrate in the second embodiment of the present invention. Referring to FIGS. 2A and 3, the array substrate 200 is similar to the array substrate 300, and the descriptions for the similarities are not repeated here. The array substrate 300 in this embodiment comprises a contact window 280. One of the first signal source connection wires 232a of the wires 230 is connected with the corresponding test shorting bars 220a through the contact window 280. Each wire 230 and each test shorting bar 220 share a part which forms the common trace 240, as shown in FIG. 3. In other words, one of the first signal source connection wires 232a of the wires 230 is electrically connected with the common trace 240 by the contact window 280, and the common traces 240 are electrically connected with pixel array connection wires 234. In this embodiment, each wire 230 and each test shorting bar 220 share a part for electrically connecting with each other.

In this embodiment, the data driving circuits 250 transmit driving signals to the first signal source connection wires 232, wherein the first signal source connection wires 232 transmit the driving signals to the common traces 240 through the contact windows 280. The driving signals are transmitted to the pixel array connection wires 234 through the common traces 240.

A material of the first signal source connection wires 232 may be different from that of the common traces 240. In this embodiment, the first signal source connection wires 232a and the test shorting bars 220a are, for example, respectively formed by using a first metal layer and a second metal layer, wherein the first metal layer and the second metal layer are two different layers. The first signal source connection wires 232a made by the second metal layer is connected to the test shorting bars 220a made by the first metal layer through wire jumping (i.e. the contact window 280). On the other hand, in this embodiment, the first signal source connection wires 232b and the test shorting bars 220b are simultaneous formed by the same first metal layer, and the first signal source connection wires 232b made by the first metal layer is directly connected to the test shorting bars 220b made by the same layer. Hence, in this embodiment the above first signal source connection wires 232a and 232b are formed respectively by using the second metal layer and the first metal layer, but the present invention is not limited thereto.

In the array substrate 300, the part shared by the wires 230 and the test shorting bars 220 is increased, and thus the space for fabricating the wires 230 and the test shorting bars 220 is further saved. Hence, the array substrate 300 has better utilization of the mother substrate when compared with the conventional technology. Further, as described in the above embodiment, when the wire 230 and the test shorting bar 220 share a part, the wire width of the test shorting bars 220 is larger than that of the wires 230, the array substrate 300 is therefore advantageous for improving the performance of defective pixels which have been repaired.

Third Embodiment

Figure 4:
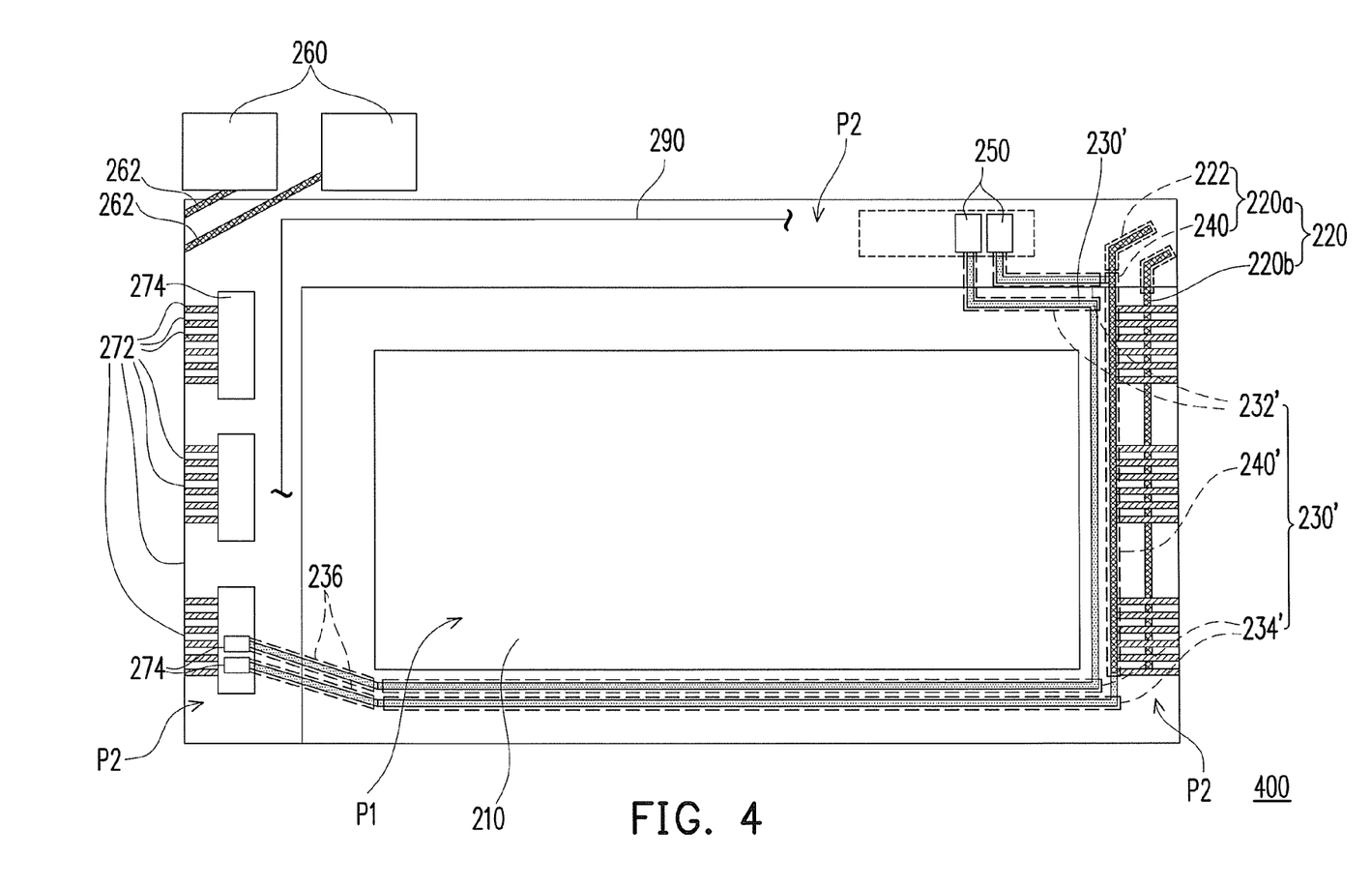
FIG. 4 is a top view illustrating an array substrate in the third embodiment of the present invention.

FIG. 4 is a top view illustrating an array substrate in the third embodiment of the present invention. Referring to FIGS. 2A and 4, an array substrate 400 is similar to the array substrate 200, and the descriptions for the similarities are not repeated here. In this embodiment, the wires 230' further comprise second signal source connection wires 236, wherein the wires 230' are also called gate signal wires. It is to say that the wires 230' are also used for transmitting the driving signals generated by the gate driving circuits 274. In this embodiment, the wires 230' are, for example, formed by the first signal source connection wires 232', the common trace 240', the pixel array connection wires 234', and the second signal source connection wires 236, as shown in FIG. 4.

Specifically, one of the wires 230' and the test shorting bar 220a are connected by the common trace 240', as shown in FIG. 4. The second signal source connection wires 236 are electrically connected with the gate driving circuits 274, so that the driving signals provided by the gate driving circuits 274 may be transmitted by the wires 230', wherein the gate driving circuits 274 are adapted for transmitting driving signals. Thus, the common trace 240 serves as trace for both the gate driving signal and the short circuit test signal.

In this embodiment, the second signal source connection wires 236 are electrically connected with the gate driving circuits 274. When the array substrate 400 is applied in a display panel (not shown), gate signals which are transmitted from top to bottom may be changed to transmit from bottom to top. Hence, the display modes, such as image direction, of the display panel may be changed according to the user's environment.

Therefore, when applied in a display panel, the array substrate 400 not only has the advantages of the array substrate 200 but also reduces the costs for producing the display panel and provides the users various display modes. Consequently, the competitiveness of the products is enhanced.

Fourth Embodiment

Figure 5:
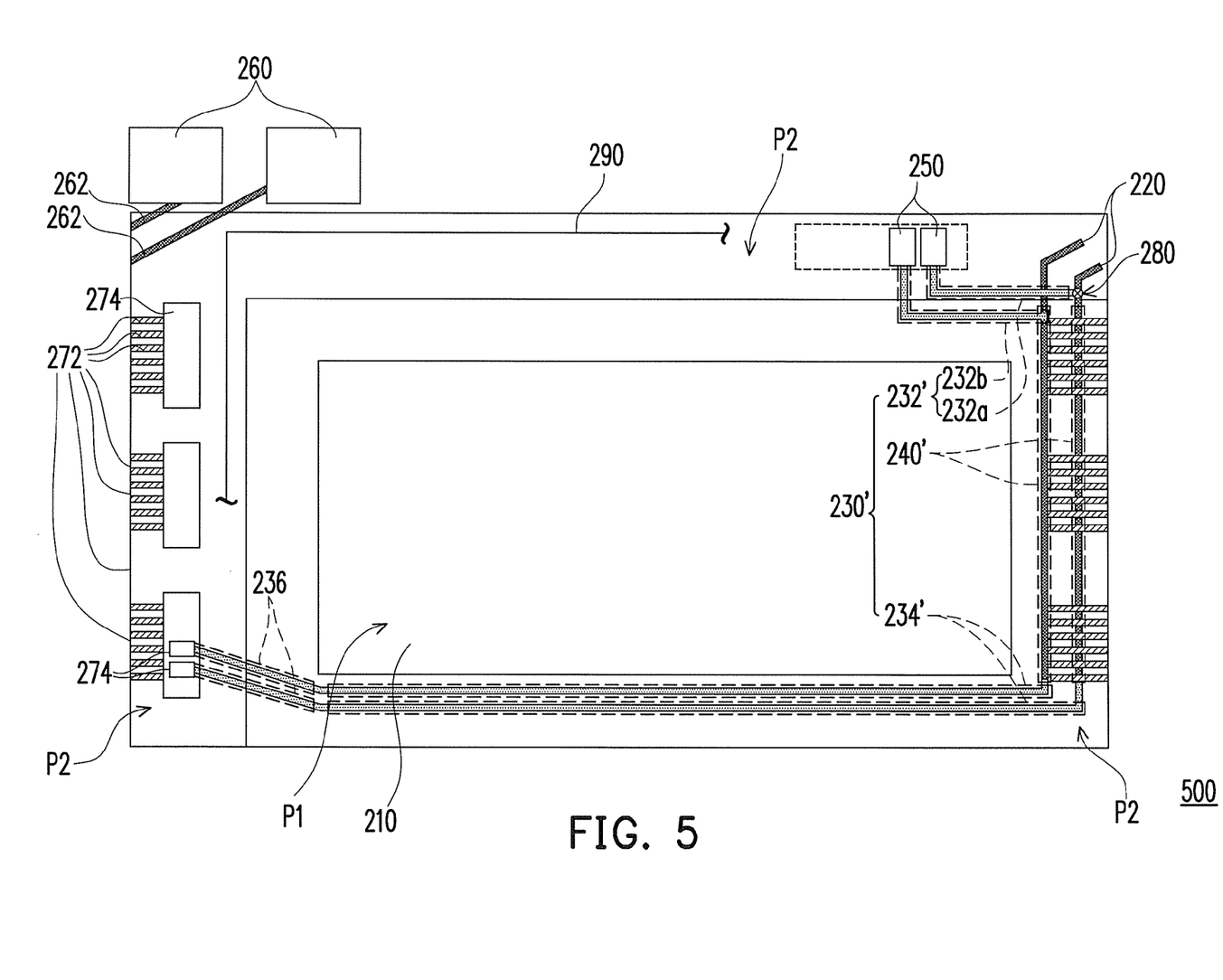
FIG. 5 is a top view illustrating an array substrate in the fourth embodiment of the present invention.

FIG. 5 is a top view illustrating an array substrate in the fourth embodiment of the present invention. Referring to FIGS. 3 and 5, an array substrate 500 is similar to the array substrate 300, and the descriptions for the similarities are not repeated here. In this embodiment, the wires 230' further comprise second signal source connection wires 236, wherein the wires 230' are also called gate signal wires. It is to say that the wires 230' are also used for transmitting the driving signals generated by the gate driving circuits 274. In this embodiment, the wires 230' are, for example, formed by the first signal source connection wires 232', the common traces 240', the pixel array connection wires 234', and the second signal source connection wires 236, as shown in FIG. 5.

Specifically, the wires 230' and the test shorting bars 220 are respectively connected by the common traces 240', as shown in FIG. 5. Similar to the foregoing embodiment, the second signal source connection wires 236 are electrically connected with the gate driving circuits 274, so that the driving signals provided by the gate driving circuits 274 may be transmitted by the wires 230', wherein the gate driving circuits 274 are adapted for transmitting driving signals, and the common traces 240' serve as traces for both the gate driving signals and short circuit test signals.

In this embodiment, the second signal source connection wire 236 are electrically connected with the gate driving circuits 274. When the array substrate 500 is applied in a display panel, the display modes, such as image direction observable by users, of the display panel may be changed according to the user's environment Hence, the array substrate 500 has the advantages of both the array substrate 300 and the array substrate 400. In other words, as described in the foregoing embodiment, when applied in a display panel, the array substrate 500 not only reduces the costs for producing the display panel but also provides the users various display modes. Consequently, the competitiveness of the products is improved.

The Fifth Embodiment

Figure 6:
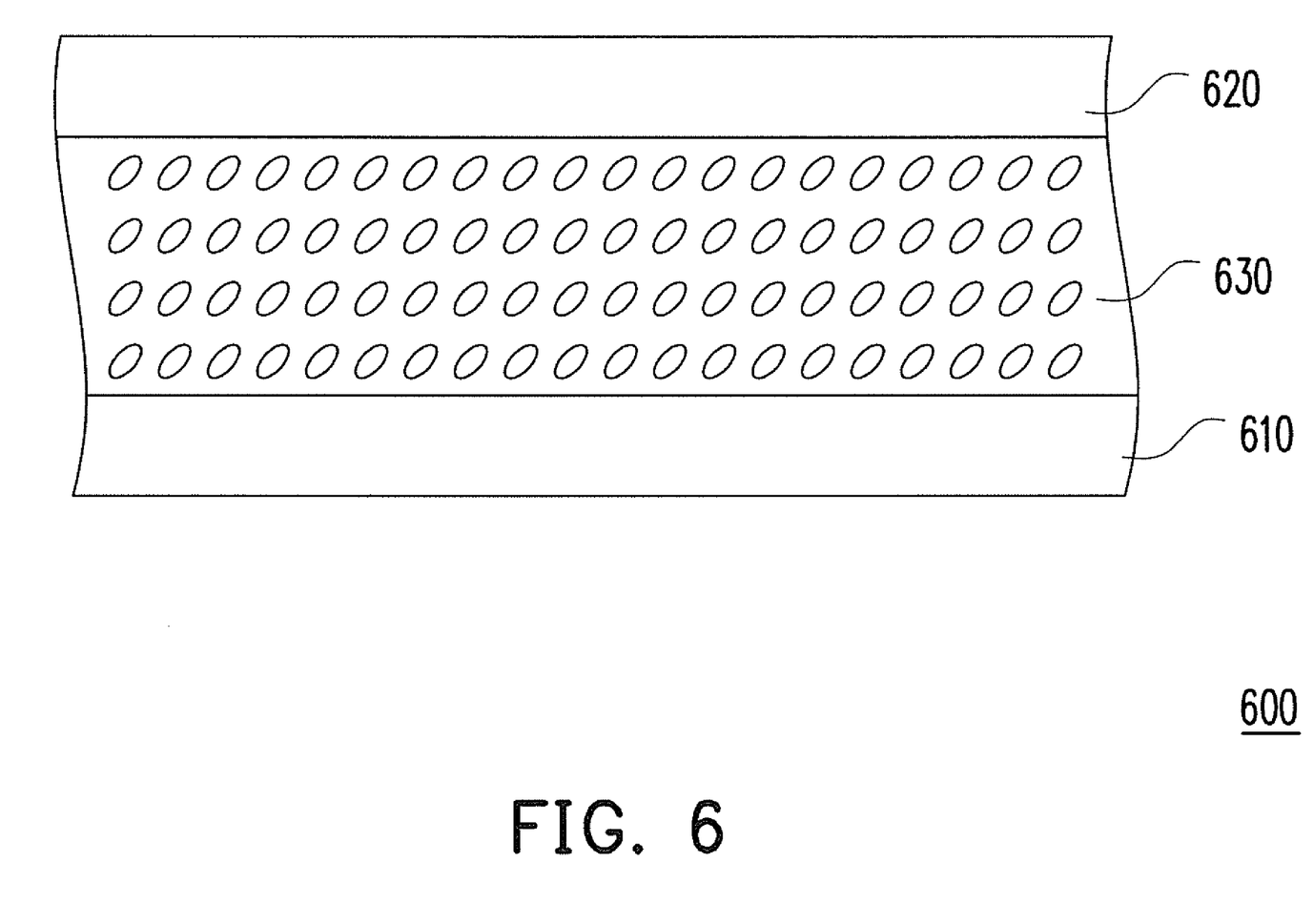
FIG. 6 is a schematic view illustrating a display panel in the fifth embodiment of the present invention.

FIG. 6 is a schematic view illustrating a display panel in the fifth embodiment of the present invention. Referring to FIG. 6, a display panel 600 comprises a first substrate 610, a second substrate 620, and a liquid crystal layer 630. The second substrate 620 is disposed opposite to the first substrate 610. The liquid crystal layer 630 is disposed between the first substrate 610 and the second substrate 620.

In this embodiment, the first substrate 610 is, for example, one of the aforesaid array substrates 200, 300, 400, and 500, and the second substrate 630 is, for example, a color filter substrate. The above is merely one of the examples, and the present invention is not limited thereto. In other words, the first substrate 610 may also be other array substrates formed based on the concept of the present invention. For instance, the first substrate 610 may be a color-filter-on-array (COA) array substrate, an array-on-color-filter (AOC) array substrate, or a substrate of other combinations. In addition to the aforesaid TFT-LCD, the display panel may also be an organic light-emitting diode (OLED) display panel, a low temperature poly-silicon (LTPS) display panel, or a plasma display panel (PDP) display panel.

In addition, according to different display modes and layer designs, the aforesaid display panel 600 may be applied in a transmissive display panel, a transflective display panel, a reflective display panel, a color-filter-on-array display panel, an array-on-color-filter display panel, a vertical alignment (VA) display panel, an in plane switching (IPS) display panel, an multi-domain vertical alignment (MVA) display panel, a twist nematic (TN) display panel, an super twisted nematic (STN) display panel, a patterned vertical alignment (PVA) display panel, an super-patterned vertical alignment (S-PVA) display panel, an advanced super-view (ASV) display panel, an fringe field switching (FFS) display panel, a continuous pinwheel alignment (CPA) display panel, an axially symmetric aligned microcell (ASM) display panel, an optically compensated bend (OCB) display panel, an super in plane switching (S-IPS) display panel, an advanced super in plane switching (AS-IPS) display panel, an ultra fringe field switching (UFFS) display panel, a polymer stabilized alignment (PSA) display panel, a dual-view display panel, a triple-view display panel, a three-dimensional display panel, a touch panel, other display panels, or a combination of the above.

In summary, the array substrate of the present invention at least has the following features. First, the wires and the test shorting bars share a part. Hence, the region of the array substrate becomes smaller and the resistance of the original wires is reduced. Furthermore, the second signal source connection wires of the wires are connected with the gate driving circuits in parts of embodiments of the present invention. When the array substrate is applied in a display panel, the display panel has various display modes. Therefore, the array substrate of the present invention not only has favorable substrate utilization but also allows the display panel disposed with the array substrate to have better display modes and lower productions costs. In addition, the gate driving circuits and data driving circuits in the present invention are simply one type of circuit which transmits driving signals. Hence, the present invention is not limited thereto.

Although the present invention has been disclosed by the above embodiments, they are not intended to limit the present invention. Anybody with ordinary knowledge in the art may make some modifications and alterations without departing from the spirit and scope of the present invention. Therefore, the protection range of the present invention falls in the appended claims.

What is claimed is:

1. An array substrate having a display region and a peripheral circuit region adjacent to the display region, the array substrate comprising:
    a pixel array disposed in the display region;
    a plurality of test shorting bars disposed in the peripheral circuit region, wherein the test shorting bars comprises a first type test shorting bar and a second type test shorting bar, and wherein the first type test shorting bar comprises a first trace and a common trace; and
    a plurality of wires disposed in the peripheral circuit region and electrically connected with the pixel array, wherein each wire comprises a first signal source connection wire, the common trace and a pixel array connection wire, wherein the first trace of the first type test shorting bar is connected with one of first signal source connection wires and one of pixel array connection wires through the common trace, which is used for transmitting driving signals and test signals, and wherein the second type test shorting bar is not connected with any one of first signal source connection wire and any one of pixel array connection wire.

2. The array substrate as claimed in claim 1, wherein the common trace connects the first signal source connection wire with the pixel array connection wire.

3. The array substrate as claimed in claim 1, further comprising a data driving circuit connected with the first signal source connection wire, and the data driving circuit being adapted for transmitting a driving signal.

4. The array substrate as claimed in claim 1, wherein a material of the first signal source connection wire, the common trace, and the pixel array wire is the same as that of the test shorting bars.

5. The array substrate as claimed in claim 2, wherein the first signal source connection wire is connected with the common trace through a contact window.

6. The array substrate as claimed in claim 5, wherein a material of the first signal source connection wire is different from that of the common trace.

7. The array substrate as claimed in claim 2, wherein each wire comprises a second signal source connection wire, the second signal source connection wire is electrically connected with a gate driving circuit, and the gate driving circuit is adapted for transmitting a driving signal.

8. The array substrate as claimed in claim 1, wherein the first trace is connected with the common trace.

9. The array substrate as claimed in claim 8, further comprising a dummy test pad connected with a dummy first trace, the first trace and the dummy first trace correspondingly disposed in the periphery circuit region respectively adjacent to two sides of the display region, and the first trace is insulated from the dummy first trace.

10. The array substrate as claimed in claim 1, further comprising a plurality of second traces, a plurality of dummy second traces, and a plurality of gate driving circuits, wherein the second traces and the dummy second traces are respectively electrically connected with the test shorting bars and the gate driving circuits, the second traces and the dummy second traces are correspondingly disposed in periphery circuit region respectively adjacent to two sides of the display region, and the second traces are insulated from the dummy second traces.

11. The array substrate as claimed in claim 1, further comprising an electrostatic protection shorting bar disposed in the peripheral circuit region, and the electrostatic protection shorting bar is insulated from the test shorting bars.

* * * * *